(12) United States Patent
Riley et al.

(10) Patent No.: US 7,396,577 B2
(45) Date of Patent: Jul. 8, 2008

(54) METHOD AND APPARATUS FOR REDUCING THE INFRARED AND RADAR SIGNATURE OF A VEHICLE

(75) Inventors: Bryan A. Riley, Bedford, TX (US); Robert A. Shepherd, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 346 days.

(21) Appl. No.: 10/514,753

(22) PCT Filed: May 23, 2003

(86) PCT No.: PCT/US03/16484

§ 371 (c)(1),
(2), (4) Date: Nov. 17, 2004

(87) PCT Pub. No.: WO03/100364

PCT Pub. Date: Dec. 4, 2003

(65) Prior Publication Data

US 2005/0208321 A1    Sep. 22, 2005

(51) Int. Cl.
*B32B 3/12* (2006.01)
*E04B 1/16* (2006.01)
(52) U.S. Cl. .............................. 428/116; 428/73; 264/34
(58) Field of Classification Search ................. 428/117; 416/224, 226
See application file for complete search history.

(56) References Cited

U.S. PATENT DOCUMENTS

| | | | | |
|---|---|---|---|---|
| 4,564,547 A | * | 1/1986 | Hughes | 428/117 |
| 4,789,304 A | * | 12/1988 | Gustafson et al. | 416/95 |
| 5,769,153 A | * | 6/1998 | Ayers | 164/479 |
| 5,837,739 A | * | 11/1998 | Nowak et al. | 521/54 |
| 6,231,794 B1 | * | 5/2001 | Woldanski | 264/45.3 |
| 6,802,907 B2 | * | 10/2004 | Lewis et al. | 134/1 |
| 2002/0047070 A1 | * | 4/2002 | Breer et al. | 244/134 R |

OTHER PUBLICATIONS

Chinese Examination Report dated Jul. 17, 2006 for Chinese Application No. 03817450.2.
English translation of Chinese Examination Report.
Chinese publication cited in Chinese Examination Report.
English translation of Chinese publication cited in Chinese Examination Report.

* cited by examiner

*Primary Examiner*—Timothy M. Speer
*Assistant Examiner*—Gordon R. Baldwin
(74) *Attorney, Agent, or Firm*—James E. Walton (57) ABSTRACT

The present invention provides a lightweight structure for simultaneously providing a reduced infrared and radar signature, while adding little or no weight to a vehicle. As such, the present invention allows for substantial improvements over prior systems. An example of the type of vehicle able to make use of the present invention is a military helicopter, but there is nothing within the spirit and scope of the present invention limiting it to any particular vehicle. The teachings of the present invention are useful with any vehicle for which a reduction in infrared emissions and microwave reflections is desired.

29 Claims, 12 Drawing Sheets

METHOD AND APPARATUS FOR REDUCING THE INFRARED AND RADAR SIGNATURE OF A VEHICLE

TECHNICAL FIELD

The present invention relates generally to methods of reducing the infrared and radar signature of a vehicle, specifically to the use of insulative and absorptive materials to reduce the amount of infrared radiation being emitted, and the radar signals being reflected, from certain aspects of the vehicle.

DESCRIPTION OF THE PRIOR ART

Vehicles involved in military operations have a need to reduce their visibility to opposing forces. This need exists for all methods modern military forces use to detect and target enemies. Examples of such methods include visual detection, audio detection, active and passive radar, and infrared detection. This need to a void detection is especially critical for aircraft, such as airplanes and helicopters, which have a high likelihood of being targeted by enemy air and ground forces using any and all of the above detection methods.

To the end of reducing the infrared signature of aircraft, a number of methods have been developed. These include the use of special exhaust ducting and shrouding to reduce the exhaust heat signature, and the addition of infrared insulative and absorptive materials on the outer surface of the aircraft. Although these methods can be very effective when properly employed, each of these methods has drawbacks. In most cases, the addition of infrared-insulative and infrared-absorptive materials to the outer skin of the aircraft represents a significant addition of weight to the aircraft and may interfere with the aerodynamics of the aircraft, reducing the performance and the range of the aircraft.

With respect to the goal of reducing the radar signature of an aircraft, both the shapes of the surfaces of the aircraft and the materials on the surfaces of the aircraft can be optimized to reduce the radar signature. Unfortunately, additional radar-absorptive materials carry with them additional weight, and shapes optimized for minimal radar signature generally exhibit less-than ideal aerodynamic characteristics.

It is important to note that the current techniques for reducing the signature for infrared and radar are generally mutually exclusive. In many cases, attempts to reduce the signature in one area of concern actually increases the signature in the other.

SUMMARY OF THE INVENTION

The present invention provides a lightweight structure for providing a reduced infrared and radar signature while adding little or no weight to a vehicle. As such, the present invention allows for substantial improvements over prior systems. An example of the type of vehicle able to make use of the present invention is a military helicopter, but there is nothing within the spirit and scope of the present invention limiting it to any particular vehicle. The teachings of the present invention are useful with any vehicle for which a reduction in infrared emissions and microwave reflections is desired.

The present invention involves the use of a unique combination of thermal insulators and radar-absorptive honeycomb in the composite skin of an aircraft. According to the present invention, an aerogel is introduced into the individual cells of the honeycomb, which are normally filled with air. In certain instances, the aerogel takes the place of solid fillers.

Using the aerogel in combination with the radar-absorptive honeycomb in the manner described herein, substantial improvements in the reduction of the aircraft signature can be realized with a negligible difference in the weight of the aircraft. Employed properly in a composite sandwich arrangement, the honeycomb can provide significant structural integrity to the outer surfaces of the aircraft. As such, the honeycomb is not "dead weight."

Although aerogels are generally not employed for structural purposes, they have the distinct advantage of being extremely light in weight for a given volume. Furthermore, aerogels are extremely good insulators, so that a relatively small volume, and therefore mass, of aerogels can provide a substantial improvement in thermal performance.

One significant advantage of the present invention is that the infrared signature and the radar signature of a vehicle can both be reduced simultaneously, without causing adverse effects in either of these areas of concern.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DESCRIPTION OF THE PREFERRED EMBODIMENT

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the invention.

Figure 1:
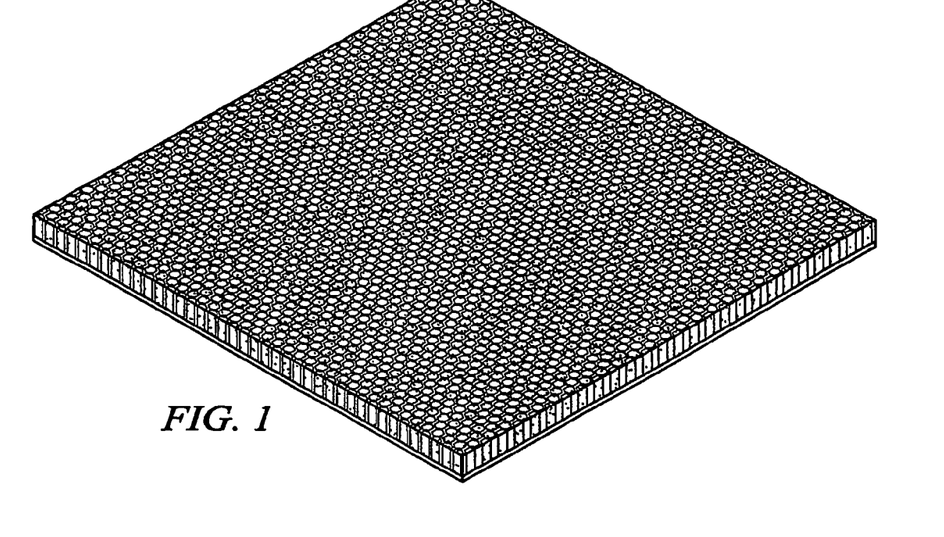
FIG. 1 is a perspective view of a radar-absorbing honeycomb panel in which the individual cells are fully filled with aerogel in accordance with one embodiment of the present invention.
Figure 2:
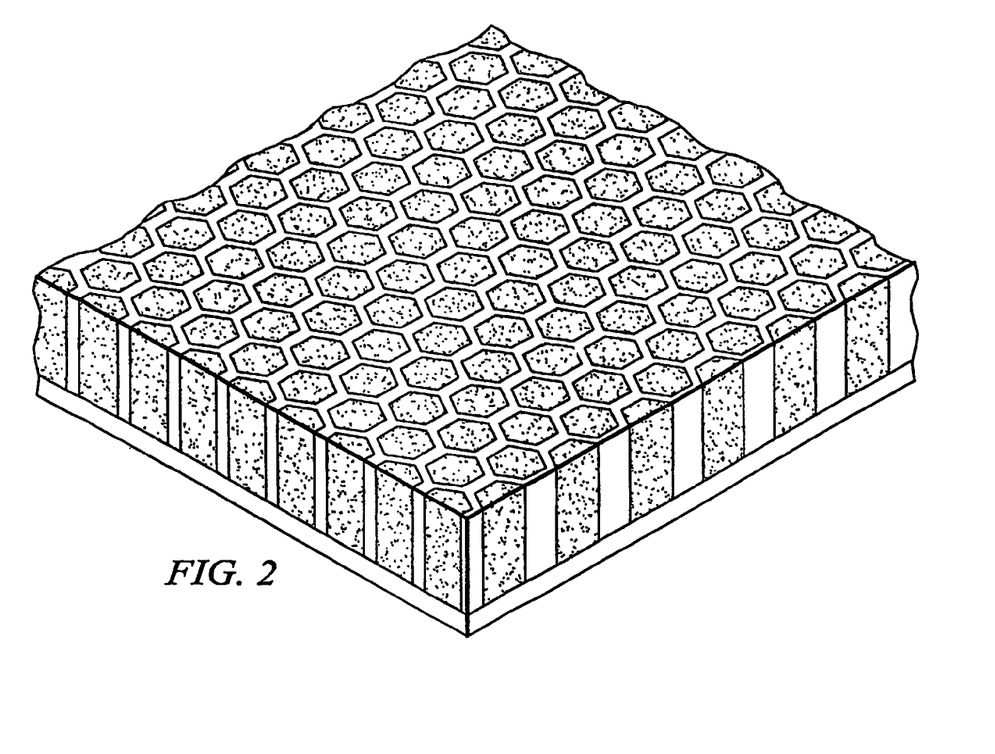
FIG. 2 is a close-up perspective view of the honeycomb panel of FIG. 1.

FIG. 1 is a perspective view of a radar-absorbing panel having a honeycomb structure and a lower skin assembly in which the individual cells of the honeycomb structure are fully filled with an aerogel in accordance with one embodiment of the present invention. FIG. 2 is a close-up perspective view of the honeycomb structure and lower skin assembly of FIG. 1. As seen in FIGS. 1 and 2, the honeycomb structure is made of an array of individual cells. The cells preferably have a hexagonal cross-sectional area; however, it should be understood that the individual cells may have cross-sectional areas of different geometrical shapes. Also, the honeycomb structure may be formed from cells having different cross-sectional shapes and sizes, depending upon the effect desired. In addition, the individual cells may have different cell geometries, including normally expanded, over expanded, under expanded, and flex cell geometries.

The cells are filled with an aerogel in one or more forms, including a granular form. The aerogel may be pre-formed having a cross-sectional shape that corresponds to the cross-sectional shape of the individual cells of the honeycomb structure, or the aerogel may be in a loose granular form. For those applications in which the aerogel is in granular form, the aerogel may be held together with a binder, the grains may be free to move within the cells, or the grains may be tightly packed within the cells. Additional advantages of filling the cells with an aerogel is that the cells can be made larger without sacrificing structural integrity, and reductions in the number of cells, typically leads to an overall reduction in the weight of the vehicle.

The type of aerogel used may vary by application. A wide range of aerogels will be know to those of skill in the art. Specific examples of suitable aerogels include silica, alumina, and zirconia aerogels. The portion of each cell filled with aerogel may vary depending on the application. Selected individual cells of the honeycomb structure may be filled with aerogel using any of a number of processes, including sifting, shaking, or raking of granular aerogel, as examples. Depending upon the desired application, the honeycomb structure may be made of any of a number of materials known to those of skill in the art. These materials include, but are not limited to, poly(m-phenylenediamine isophthalamide) sold under the trade name NOMEX, fiberglass, poly (p-phenylenediamine terephthalamide) sold under the trade name KEVLAR, and an aramid fiber with rhenolic resin sold under the trade name KOREX.

In certain applications, the cells may be filled partially with an aerogel and partially with an additional radar-absorbing and/or an additional infrared-absorbing material. Although radar absorption is performed by the material that forms the walls of the honeycomb, this material is typically a poor thermal insulator. Partially filling the cells with a radar-absorbing material is advantageous because, by making the cells of the honeycomb layer larger and adding a radar absorbing material to the aerogel, structural integrity is maintained, thermal conductivity is reduced, and radar absorption is maintained or increased. For example, by adding graphite carbon to the aerogel, the radar absorbing properties of the panel can be considerably improved. Furthermore, it will be appreciated that a wide variety of materials may be added to the aerogel to improve selected properties of the panel, such as electrical conductivity, thermal conductivity, radar absorption, and others. By selectively combining different materials in the individual cells of the honeycomb structure, the overall properties of the panel can be selectively tuned for specific applications.

After the selected honeycomb cells are filled to the desired level with the chosen combination of aerogel and/or other materials, an upper skin is added to the top of the honeycomb structure to complete the panel. The assembly is then cured. The skin material can vary from one application to another. Examples of suitable materials include fiberglass, carbon fiber, and quartz. In certain applications using certain materials, a room temperature cure may be employed. Other applications may require elevated temperature and/or pressure in order to effect a proper cure.

It has been determined that evacuation of the honeycomb cells provides significant thermal advantages over the combination of aerogel and air. Alternately, the honeycomb cells can be filled with a low-density gas in order to improve the thermal performance without the additional mechanical stresses imposed by a pressure differential across the skins.

Figure 3:
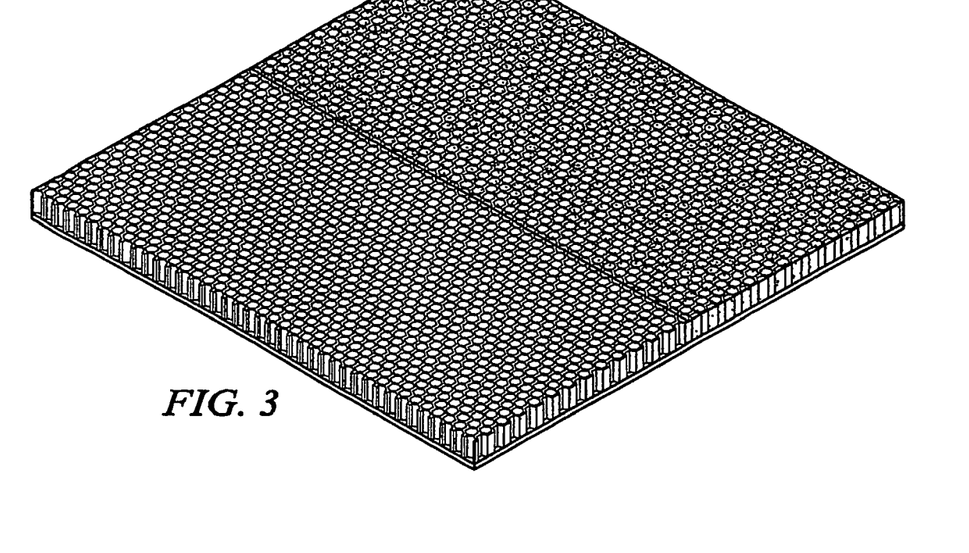
FIG. 3 is a perspective view of a radar-absorbing honeycomb panel in which the individual cells are half-filled with aerogel in accordance with one embodiment of the present invention.
Figure 4:
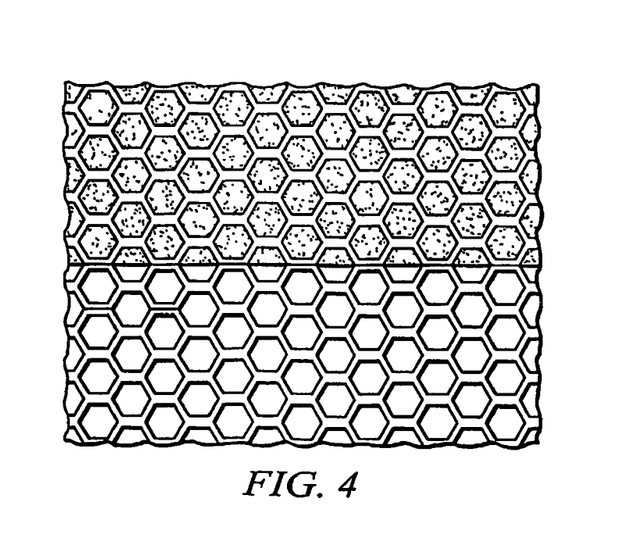
FIG. 4 is a close-up perspective view of the honeycomb panel of FIG. 3.
Figure 5:
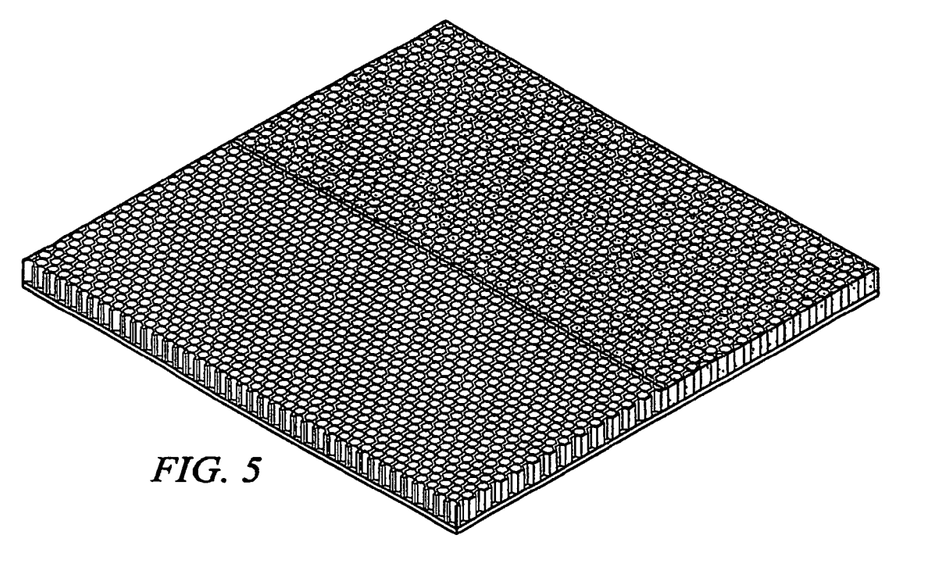
FIG. 5 is a perspective view of a radar-absorbing honeycomb panel in which the individual cells are half-filled with aerogel in accordance with one embodiment of the present invention.
Figure 6:
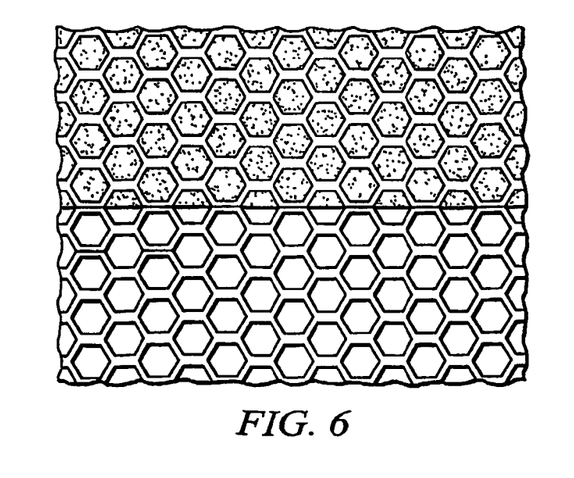
FIG. 6 is a close-up perspective view of the honeycomb panel of FIG. 5.

FIGS. 3 and 5 are perspective views of a radar-absorbing honeycomb structure and lower skin assembly having half of the individual cells of the honeycomb structure filled with aerogel and the other half empty in accordance with one embodiment of the present invention. FIGS. 4 and 6 are close-up perspective views of the honeycomb structure and lower skin assembly of FIGS. 3 and 5.

The aerogel-filled portion of the honeycomb assembly of FIGS. 3-6 is similar to the aerogel-filled honeycomb assembly shown in FIGS. 1 and 2. The empty portion of the honeycomb assembly is distinct from the honeycomb assembly of FIGS. 1 and 2 in that its cells are empty. This selective filling of certain individual cells of the honeycomb structure is particularly well suited for applications in which an infrared heat source lies under a particular location of the panel, in that the aerogel-filled cells provide additional thermal insulation at that location of the panel. In addition, this selective filling of certain individual cells of the honeycomb structure is also beneficial in applications in which a panel requires additional strength in a certain location. This is possible because packing individual cells with the aerogel and/or other materials adds strength to the panel.

Figure 7:
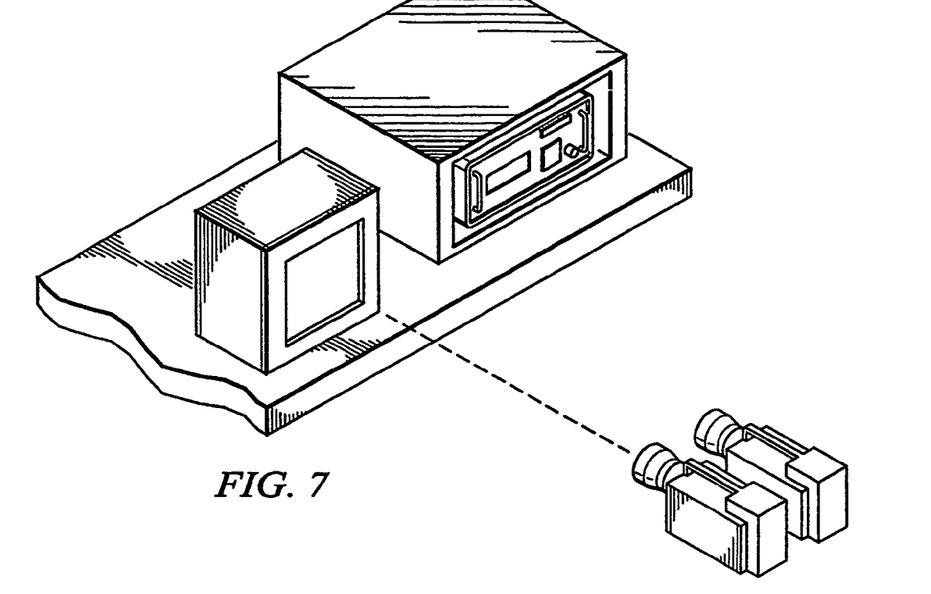
FIG. 7 is a perspective view of a laboratory testing station useful for testing the thermal performance of the honeycomb panel of the present invention.
Figure 8:
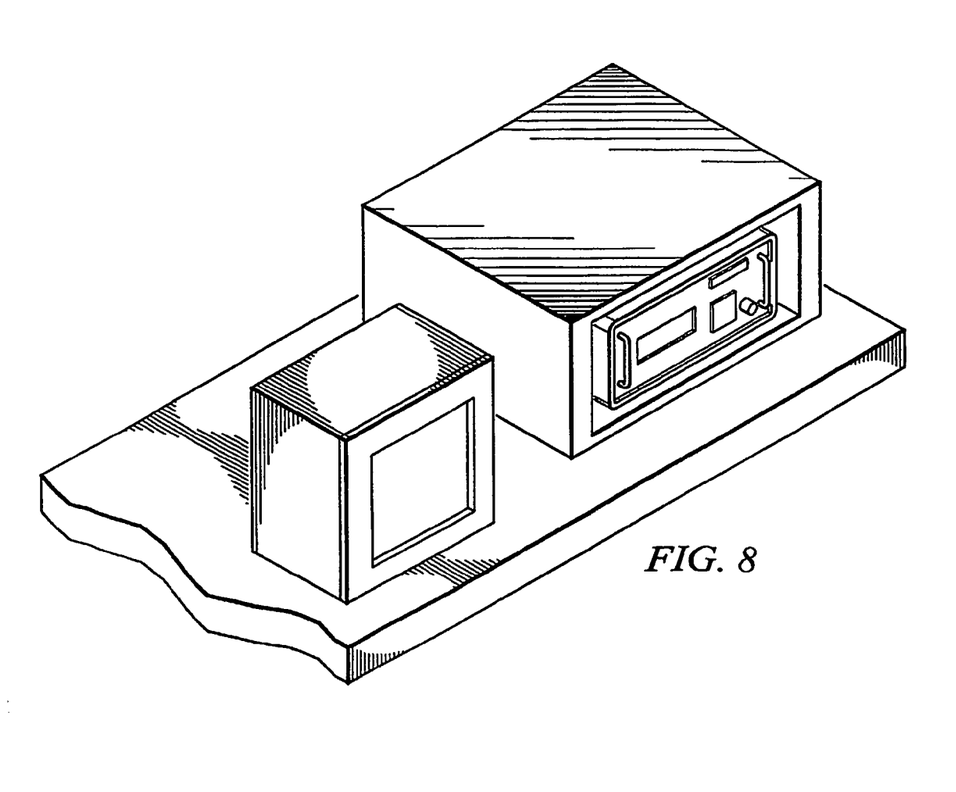
FIG. 8 is a close-up perspective view of the blackbody heat source and temperature controller shown in FIG. 7.

FIG. 7 is a perspective view of a laboratory testing station useful for testing the thermal performance of the panel of the present invention. FIG. 8 is a close-up perspective view of a blackbody heat source and a temperature controller shown in FIG. 7.

The testing station of FIGS. 7 and 8 incorporates a blackbody heat source, a temperature controller, and one or more thermal cameras focused on the surface of the blackbody heat source. The temperature controller and blackbody heat source are designed work together to maintain a uniform emission of infrared radiation from the front surface of the blackbody heat source. The thermal cameras are sensitive to the infrared spectrum, rather than the visible spectrum, and can be used to capture a thermal image of either the front surface of the blackbody heat source or the front surface of an object disposed directly in front of the blackbody heat source.

Figure 9:
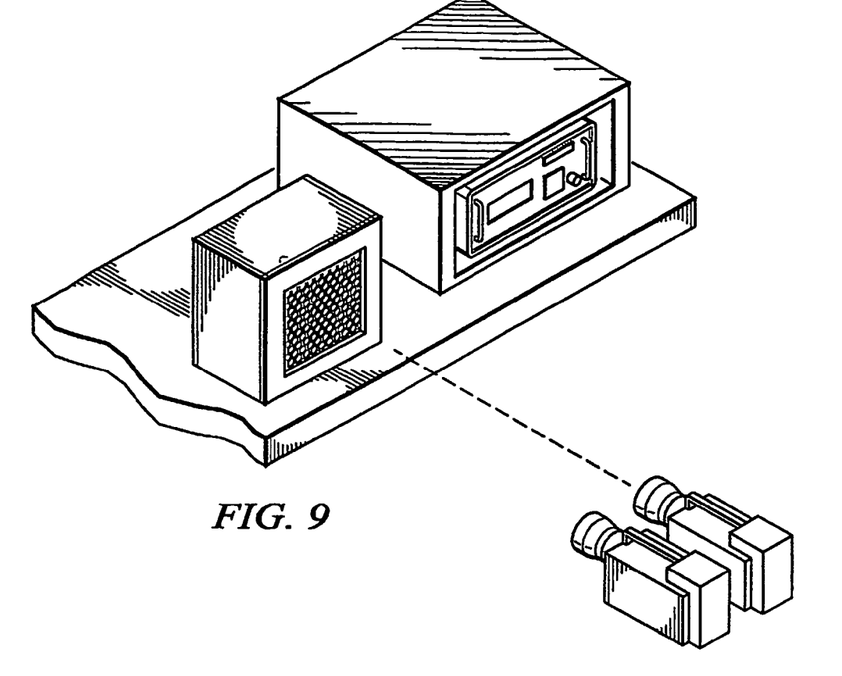
FIG. 9 is a perspective view of the laboratory testing station of FIG. 7 showing a honeycomb panel according to the present invention affixed to the front of the blackbody heat source.
Figure 10:
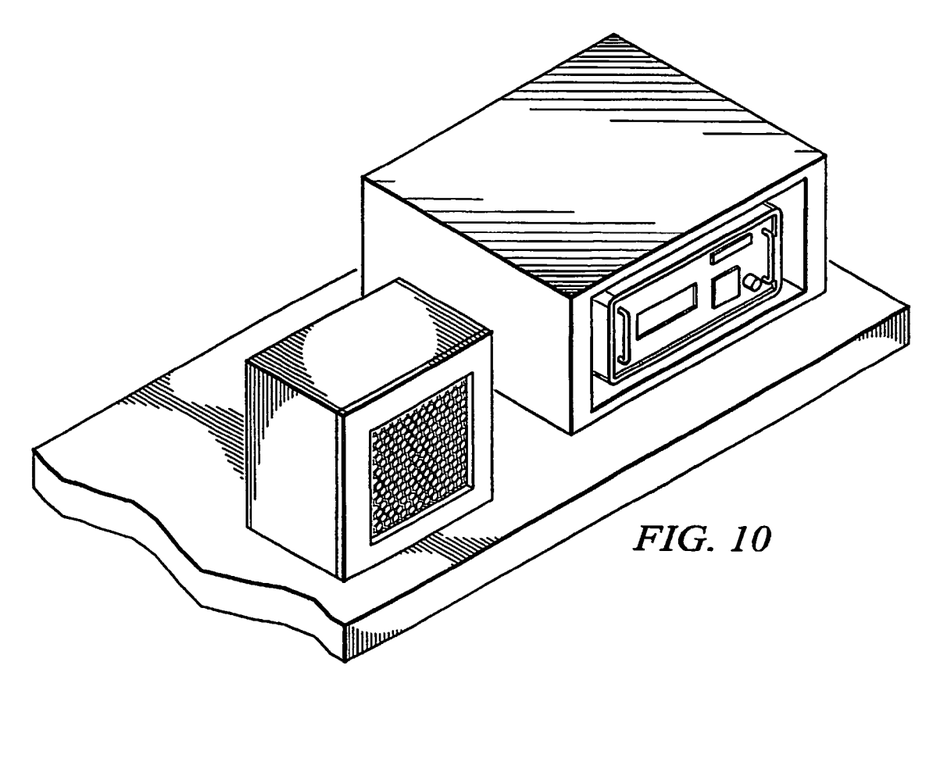
FIG. 10 is a close-up perspective view of the blackbody heat source and temperature controller shown in FIG. 9, with the honeycomb panel affixed to the front of the blackbody heat source.

FIG. 9 is a perspective view of the laboratory testing station of FIG. 7 showing a honeycomb panel according to the present invention affixed to the front of the blackbody heat source. FIG. 10 is a close-up perspective view of the blackbody heat source and the temperature controller shown in FIG. 9, with a honeycomb panel affixed to the front of the blackbody heat source.

In this arrangement, the thermal cameras capture a thermal image of the front surface of the honeycomb panel rather than the front surface of the blackbody heat source, as the honeycomb panel is disposed between the blackbody heat source and the thermal cameras. Accordingly, owing to the relatively uniform level of infrared radiation emitted from the front surface of the blackbody heat source, this arrangement can be used to measure the thermal characteristics of the honeycomb panel at various points across its surface, at various temperatures, and at various times.

Figure 11:
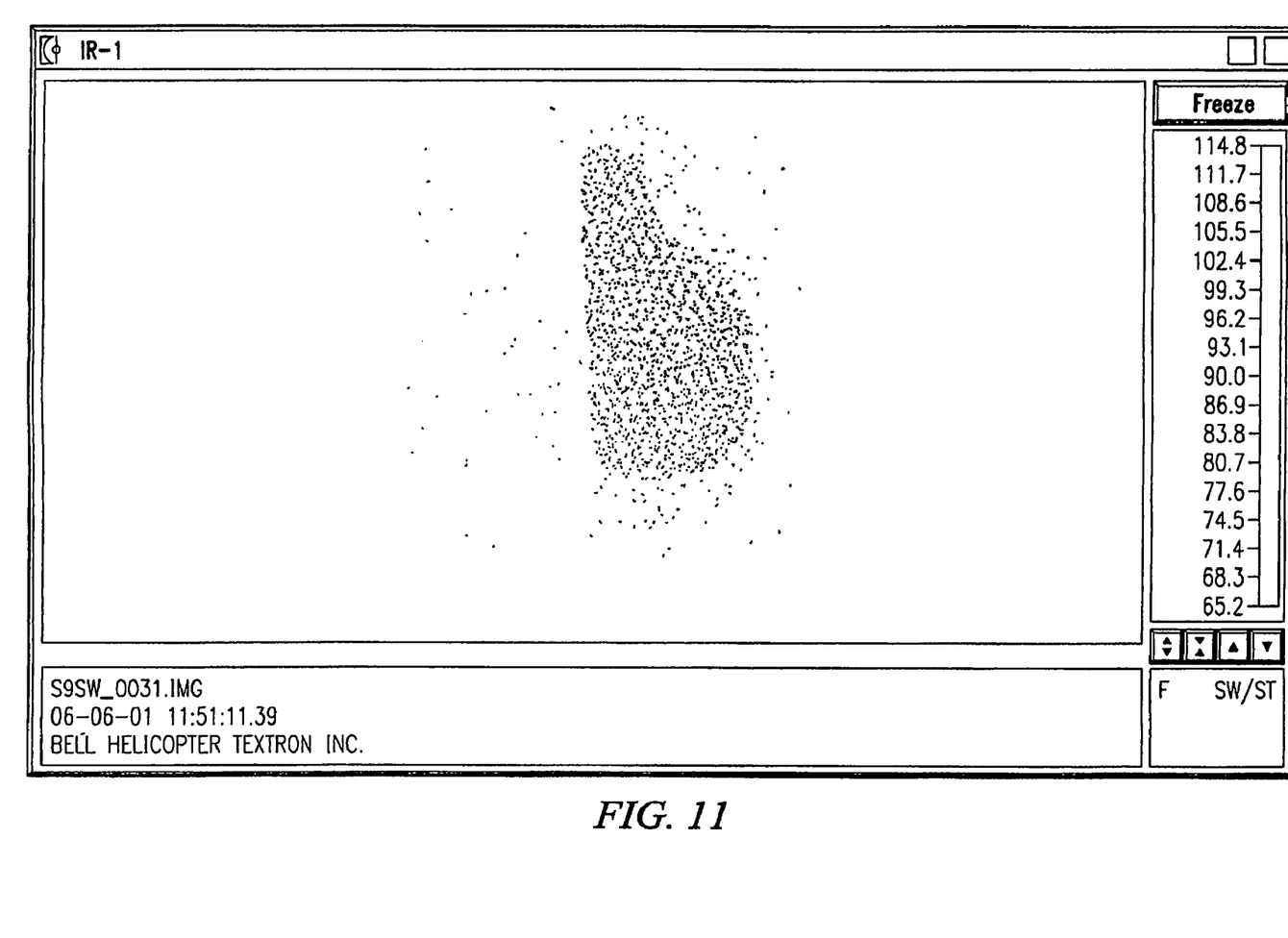
FIG. 11 is a computer screen shot of a thermal image of the front side of the honeycomb panel opposite the blackbody heat source.

FIG. 11 is a computer screen shot of a thermal image of the front side of a honeycomb panel opposite the blackbody heat source obtained using the testing apparatus shown in FIGS. 9 and 10. It can be seen in FIG. 11 that the temperature on the right half of the panel is considerably higher than the temperature on the left half of the panel. This temperature differential is attributable to the presence of aerogel-filled cells on the left side of the honeycomb panel, as contrasted with the empty cells on the right side of the panel.

Figure 12:
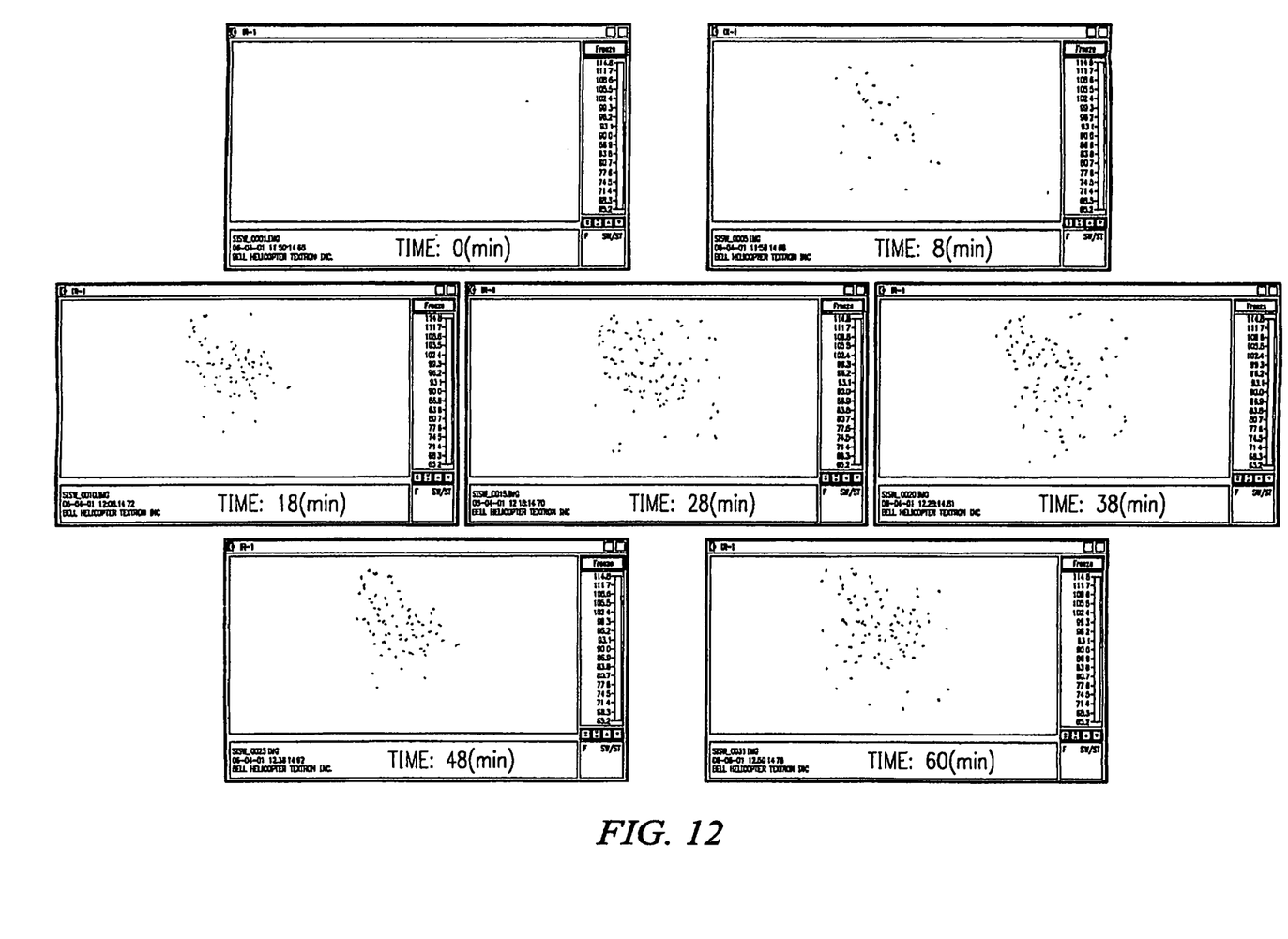
FIG. 12 is a set of computer screen shots of thermal images of the front side of a honeycomb panel having no aerogel in its cells.

FIG. 12 is a set of computer screen shots of thermal images of the front side of a honeycomb panel having no aerogel in its cells. It can be seen in these figures that the temperature of the front side of the panel reaches a relatively steady state within approximately 18 minutes.

Figure 13:
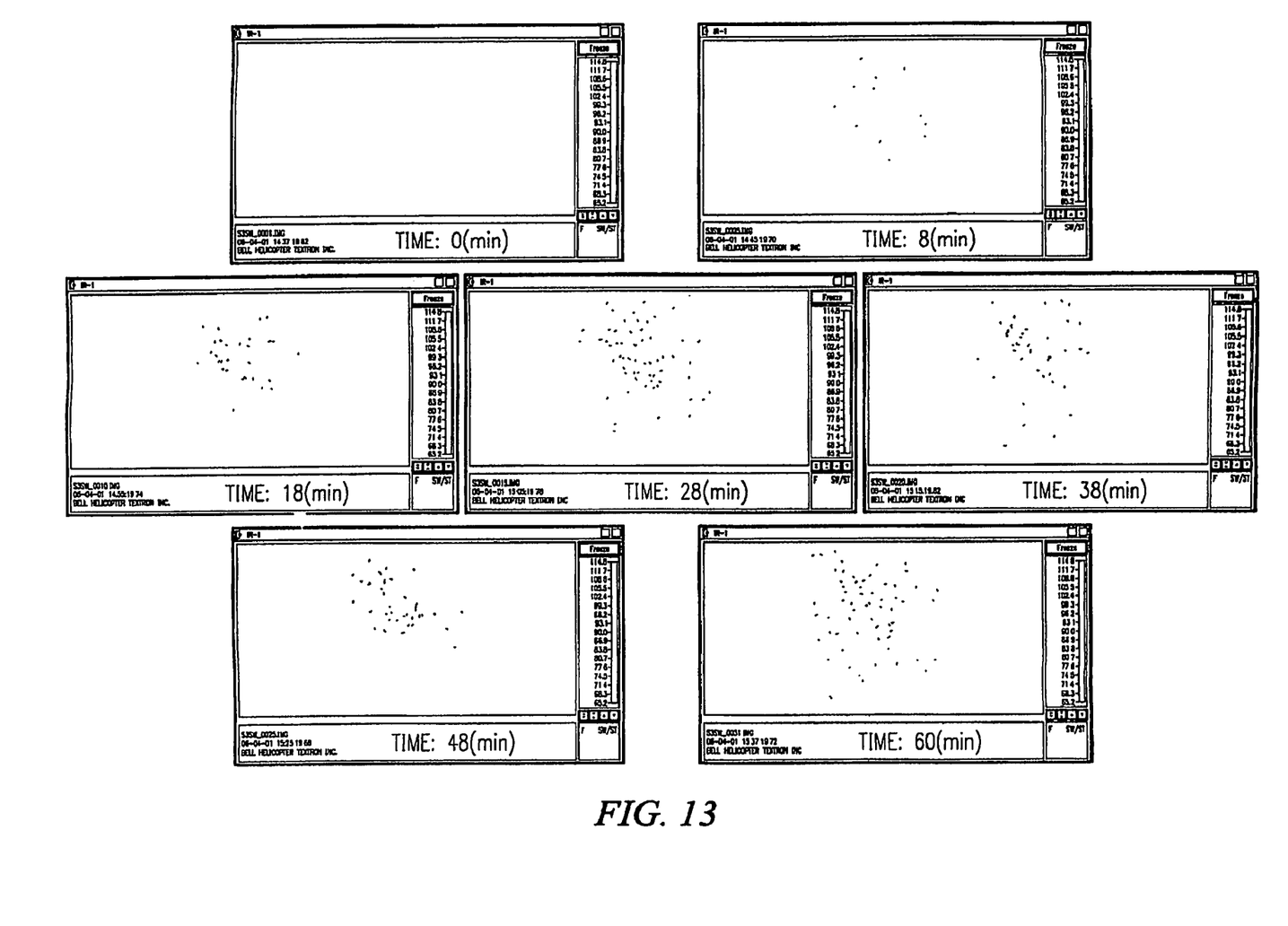
FIG. 13 is a set of computer screen shots of thermal images of the front side of a honeycomb panel having its cells 25% filled with aerogel.

FIG. 13 is a set of computer screen shots of thermal images of the front side of a honeycomb panel having its cells 25% filled with aerogel. As with the results shown in FIG. 12, it can be seen in these figures that the temperature of the front side of the panel reaches a relatively steady state within approximately 18 minutes. In contrast to the results shown in FIG. 12, however, the results shown in FIG. 13 exhibit substantially lower temperatures than the results shown in FIG. 12.

Figure 14:
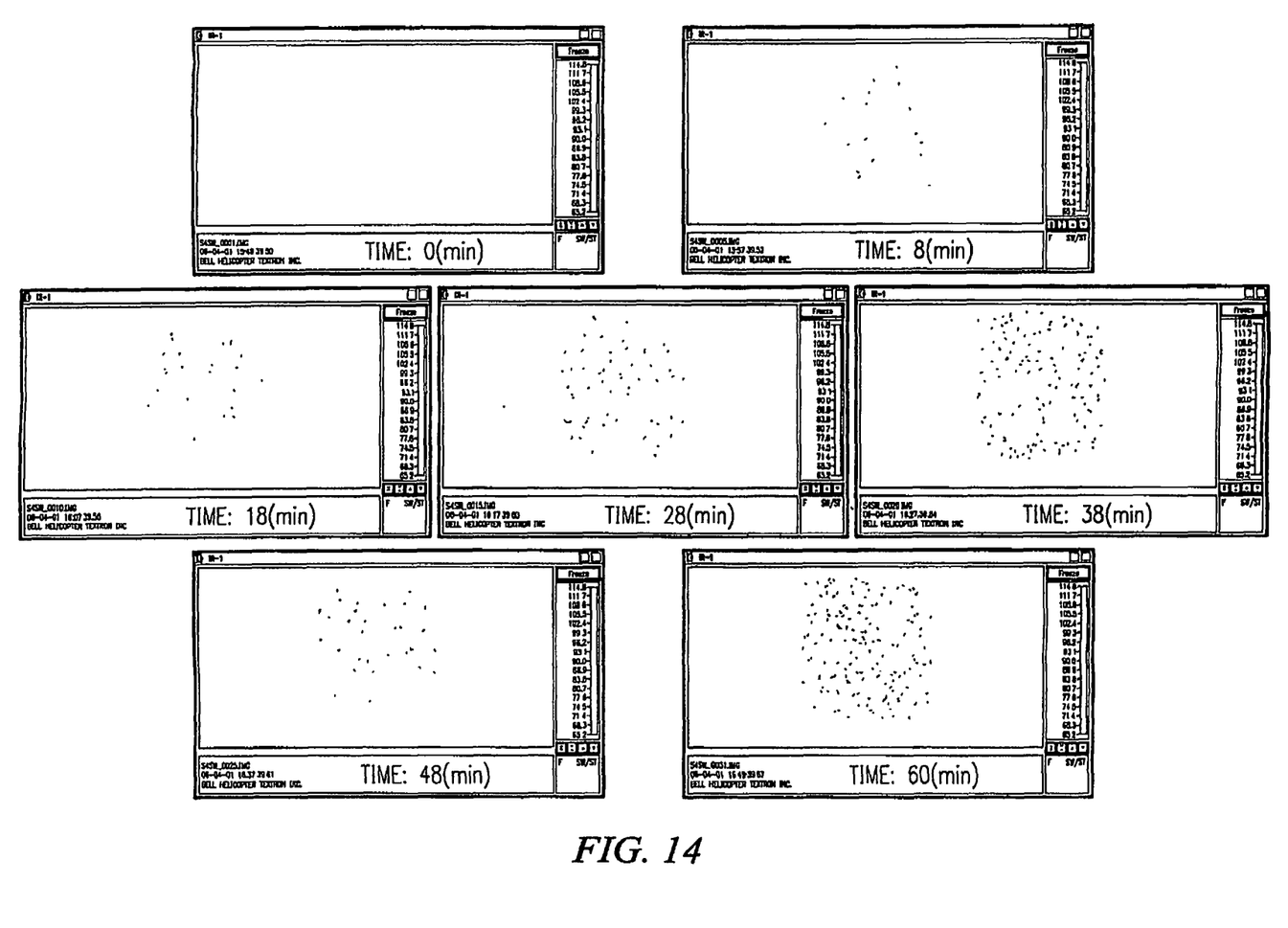
FIG. 14 is a set of computer screen shots of thermal images of the front side of a honeycomb panel having its cells 50% filled with aerogel.
Figure 15:
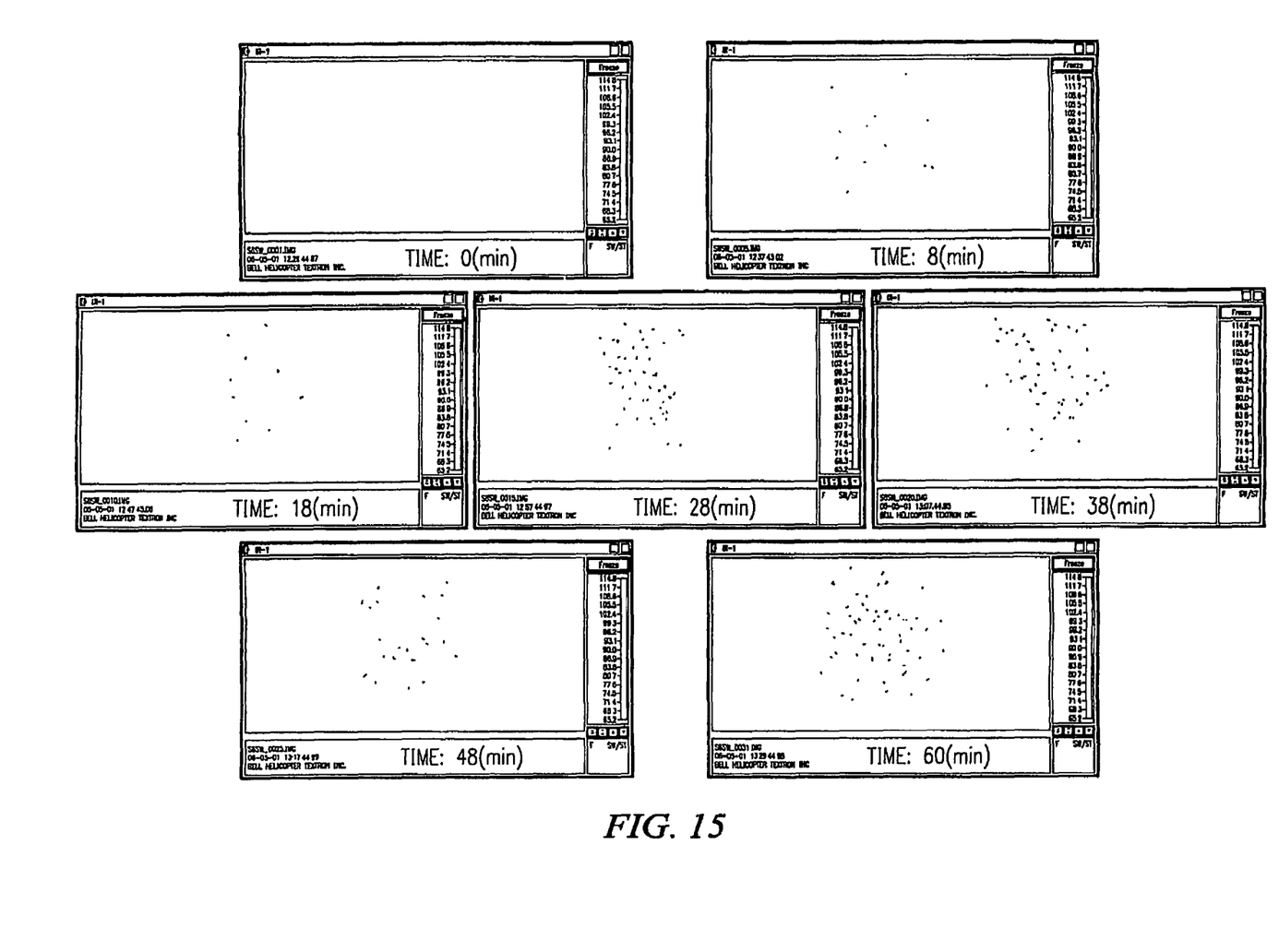
FIG. 15 is a set of computer screen shots of thermal images of the front side of a honeycomb panel having its cells 75% filled with aerogel.
Figure 16:
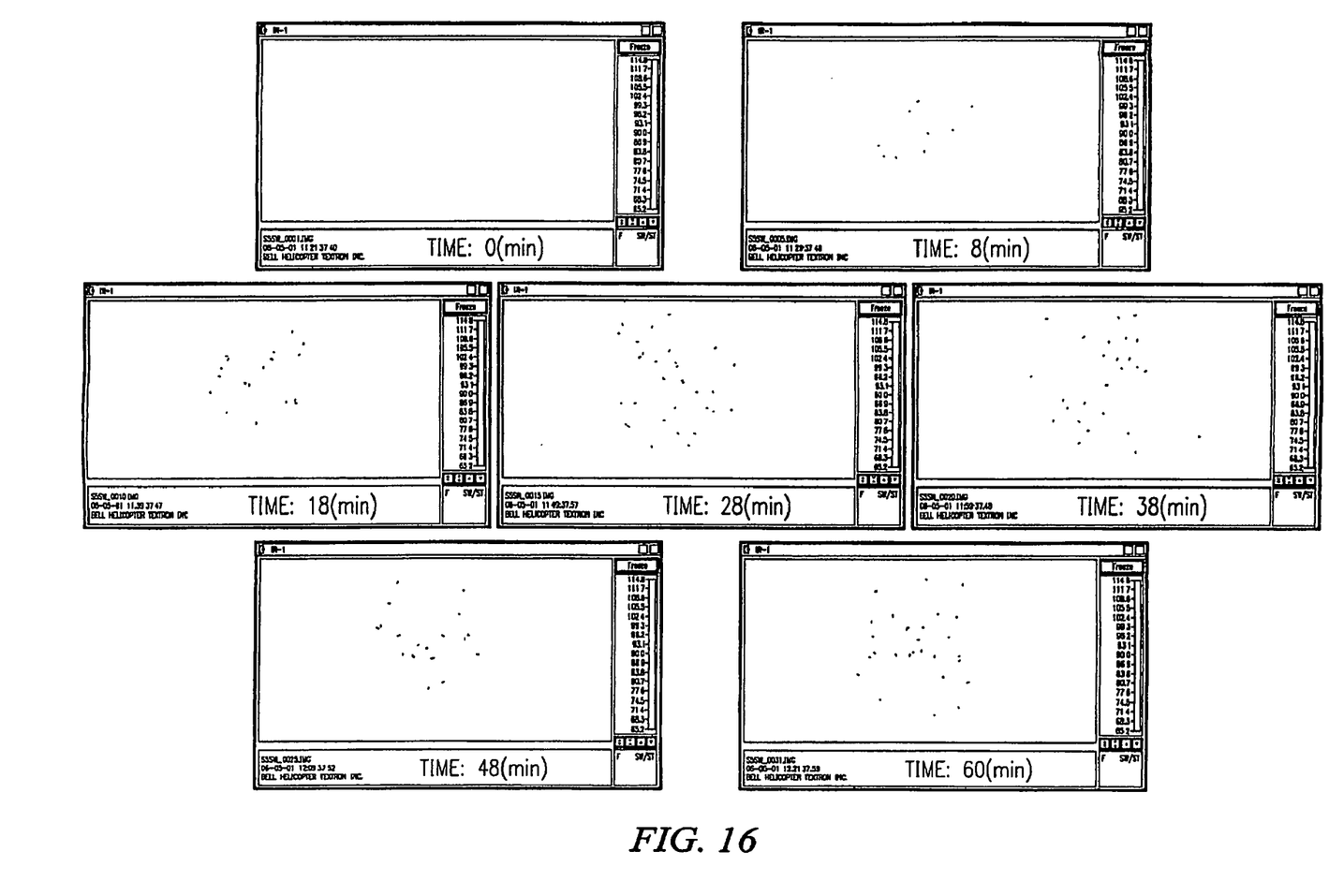
FIG. 16 is a set of computer screen shots of thermal images of the front side of a honeycomb panel having its cells 100% filled with aerogel.

FIG. 14 is a set of computer screen shots of thermal images of the front side of a honeycomb panel having its cells 50% filled with aerogel. FIG. 15 is a set of computer screen shots of thermal images of the front side of a honeycomb panel having its cells 75% filled with aerogel. FIG. 16 is a set of computer screen shots of thermal images of the front side of a honeycomb panel having its cells 100% filled with aerogel. Comparison of these results with one another and with the results shown in FIGS. 12 and 13 reveals that the increase in the proportion of aerogel within each cell has a substantial effect on the infrared signature of the panel.

Figure 17:
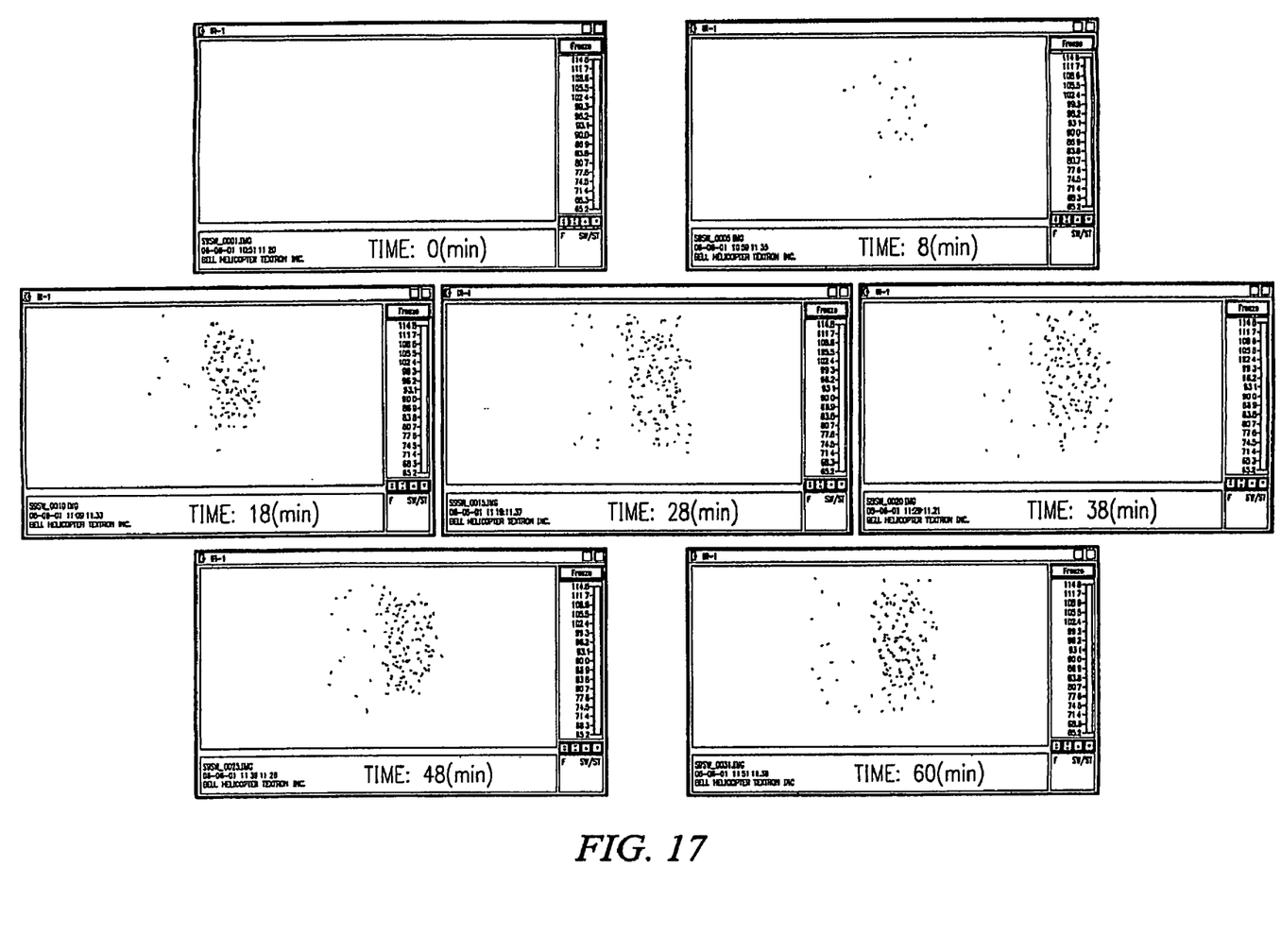
FIG. 17 is a set of computer screen shots of thermal images of the front side of a honeycomb panel having half of its cells 100% filled with aerogel and half of its cells empty.

FIG. 17 is a set of computer screen shots of thermal images of the front side of a honeycomb panel having half of its cells 100% filled with aerogel and half of its cells empty, in the same manner as the panel described in connection with FIGS. 1-5 and 11. It can be seen in this Figure that the thermal performance of this panel is similar to the performance seen in FIG. 11.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A panel for a vehicle comprising:
a lower skin;
an upper skin;
a radar-absorbing honeycomb structure formed from an array of individual cells having selected cross-sectional areas disposed between the lower skin and the upper skin; and
a thermally insulative material disposed within the individual cells of the honeycomb structure;
wherein the honeycomb structure reduces a radar signature of the vehicle, and the thermally insulative material reduces an infrared signature of the vehicle; and
wherein the thermally insulative material is an aerogel in granular form and the grains of the aerogel are free to move within the individual cells.

2. The panel according to claim 1, wherein the lower skin and the upper skin are formed from composite materials.

3. The panel according to claim 2, wherein the lower skin is formed from a material selected from the group of fiberglass, carbon fiber, and quartz.

4. The panel according to claim 2, wherein the upper skin is formed from a material selected from the group consisting of fiberglass, carbon fiber, and quartz.

5. The panel according to claim 1, wherein the honeycomb structure is formed from composite materials.

6. The panel according to claim 5, wherein the honeycomb structure is formed from a material selected from the group consisting of poly (m-phenylenediamine isophthalamide), fiberglass, poly (p-phenylenediamine terephthalamide), and an aramid fiber with phenolic.

7. The panel according to claim 1, wherein the thermally insulative material completely fills the individual cells of the honeycomb structure.

8. The panel according to claim 1, wherein the thermally insulative material partially fills the individual cells of the honeycomb structure.

9. The panel according to claim 1, wherein the aerogel is from the group consisting of silica, alumina, and zirconia.

10. The panel according to claim 1, wherein the grains of the aerogel are placed in the individual cells by a sifting process.

11. The panel according to claim 1, wherein the grains of the aerogel are placed in the individual cells by a shaking process.

12. The panel according to claim 1, wherein the grains of the aerogel are placed in the individual cells by a raking process.

13. The panel according to claim 1, wherein the thermally insulative material is maintained in a vacuum.

14. The panel according to claim 1, wherein the thermally insulative material further comprises:
a gas.

15. The panel according to claim 1, wherein the individual cells have a hexagon cross-sectional shape.

16. The panel according to claim 1, wherein the individual cells have a normally expanded geometry.

17. The panel according to claim 1, wherein the individual cells have an over expanded geometry.

18. The panel according to claim 1, wherein the individual cells have an under expanded geometry.

19. The panel according to claim 1, wherein the individual cells have a flex cell geometry.

20. The panel according to claim 1, further comprising:
a radar absorbing material disposed within the individual cells of the honeycomb structure;
wherein the radar absorbing material additionally reduces the radar signature of the vehicle.

21. The panel according to claim 1, wherein the radar absorbing material is graphite carbon.

22. A panel for a vehicle comprising:
a lower skin;
an upper skin;
a radar-absorbing honeycomb structure formed from an array of individual cells disposed between the lower skin and the upper skin; and
a thermally insulative material disposed within selected individual cells of the honeycomb structure;
wherein the honeycomb structure reduces a radar signature of the vehicle, and the thermally insulative material reduces an infrared signature of the vehicle; and
wherein the thermally insulative material is an aerogel in granular form and the grains of the aerogel are free to move within the individual cells.

23. A method of simultaneously reducing the radar signature and the infrared signature of a vehicle panel comprising:
providing a lower skin;
providing an upper skin;
forming a radar-absorbing honeycomb structure from an array of individual cells;
disposing the honeycomb structure between the lower skin and the upper skin; and
disposing a thermally insulative material within the individual cells of the honeycomb structure; and
wherein the thermally insulative material is an aerogel in granular form and the grains of the aerogel are free to move within the individual cells.

24. The method according to claim 23, wherein disposing a thermally insulative material within the individual cells of the honeycomb layer is achieved by completely filling the individual cells.

25. The method according to claim 23, wherein disposing a thermally insulative material within the individual cells of the honeycomb layer is achieved by partially filling the individual cells.

26. The method according to claim 23, wherein the thermally insulative material further comprises:
a low-density gas.

27. The method according to claim 23, further comprising:
evacuating the individual cells after the insulative material is disposed therein.

28. The method according to claim 23, wherein the thermally insulative material further comprises:
a radar absorbing material.

29. A method of selectively tuning the infrared and radar absorbing properties of a vehicle panel, the method comprising the steps of:
providing a lower skin;
providing an upper skin;
forming a radar-absorbing honeycomb structure from an array of individual cells;
disposing the honeycomb structure between the inner skin and the outer skin; and
disposing a combination of selected materials within the individual cells of the honeycomb structure to alter selected physical properties of the vehicle panel;
wherein the combination of selected materials includes an aerogel in granular form and the grains of the aerogel are free to move within the individual cells.

* * * * *